(12) United States Patent
Khayrallah

(10) Patent No.: US 8,345,784 B2
(45) Date of Patent: Jan. 1, 2013

(54) REDUCED-COMPLEXITY EQUALIZATION WITH SPHERE DECODING

(75) Inventor: Ali S. Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 876 days.

(21) Appl. No.: 12/479,081

(22) Filed: Jun. 5, 2009

(65) Prior Publication Data

US 2010/0309796 A1 Dec. 9, 2010

(51) Int. Cl.
*H04L 5/12* (2006.01)
(52) U.S. Cl. ....................................... 375/262
(58) Field of Classification Search .............. 370/252, 370/310, 400; 375/262, 265, 267
See application file for complete search history.

(56) References Cited

U.S. PATENT DOCUMENTS

2002/0141506 A1* 10/2002 Chen ............................. 375/262
2005/0135498 A1* 6/2005 Yee ................................ 375/267

OTHER PUBLICATIONS

Koike et al.: "Adaptive MLSE Equalizer with Per-Survivor or Decomposition for Trellis-Coded MIMO Transmission" Wireless Personal Communications, Kluwer Academic Publishers, DO LNKDDOI: 10. 1007/S11277-005-8750-X, vol. 35, No. 1-2, Oct. 1, 2005, pp. 213-225, XP019271949 ISSN: 1572-834X p. 214-p. 218 figures 1, 2.

Ramesh et al.: "Prefilter design for low-complexity equalization of MIMO systems" Vehicular Technology Conference, 2004. VTC 2004-Spring. 2004 IEEE 59th Milan, Italy May 17-19, 2004, Piscataway, NJ, USA, IEEE, US LNKO-OOI:10.1109/VETECS. 2004.1388954, vol. 2, May 17, 2004, pp. 871-875, XP010766034 ISBN: 978-0-7803-8255-8 the whole document.

* cited by examiner

*Primary Examiner* — Leon-Viet Nguyen

(57) ABSTRACT

Techniques for spherical decision-feedback sequence estimation are disclosed. A received signal is equalized by forming a trellis comprising a plurality of stages, each stage corresponding to a symbol time and comprising a plurality of nodes, each having a node state. A most likely received symbol sequence is identified by evaluating cumulative state metrics for the nodes according to MLSE or DFSE criteria. The trellis is formed by selecting a set of fan-out branches for each node by identifying, of all possible state transition branches from the node to successor nodes in the succeeding stage, those state transition branches that have a spherical branch metric less than a pre-determined metric limit, and determining the cumulative state metric for each node as a function of the cumulative state metrics for predecessor nodes in the preceding stage and the spherical branch metrics for fan-out branches connecting the predecessor nodes to the node.

16 Claims, 6 Drawing Sheets

REDUCED-COMPLEXITY EQUALIZATION WITH SPHERE DECODING

TECHNICAL FIELD

The present invention relates generally to multi-carrier wireless telecommunication systems and relates in particular to methods and apparatus for equalizing received signals in wireless receivers to reduce inter-symbol interference arising from multi-path dispersion.

BACKGROUND

The decision-feedback sequence estimator (DFSE) is a very effective approximation to the maximum likelihood sequence estimator (MLSE), which is the optimal equalizer in a certain sense. The DFSE has a much reduced complexity in comparison to the MLSE, while maintaining comparable performance. It has been applied effectively to wireless receivers for the GSM standard, which employs GMSK modulation, as well as to receivers developed for GSM's evolutionary standard, EDGE (Enhanced Data for GSM Evolution), which uses 8PSK modulation.

With the introduction of larger modulation constellations (e.g., 64-QAM) in more recent wireless communication standards, as well as with the increased complexity arising from the deployment of multiple antenna transmission strategies, it is increasingly important to design new equalizers with still further complexity reduction compared to the conventional DFSE, while still maintaining good performance.

SUMMARY

The well-known DFSE is an effective method for reducing the state space of an inter-symbol interference trellis in comparison to the MLSE. However, the DFSE does not reduce the fan-in and fan-out of each state, compared to the MLSE. The spherical decision-feedback sequence estimator (SDFSE) described herein has reduced complexity compared to the DFSE, while still maintaining good performance. The effect of the introduction of sphere decoding techniques to the DFSE is to reduce the fan-in and fan-out of the DFSE states. This reduction focuses the trellis search on the most promising symbol sequences, and avoids wasting computations on unlikely sequences.

An exemplary method, according to some embodiments of the present invention, for equalizing a received signal transmitted through a dispersive channel, may be implemented in a wireless communications receiver, and includes forming a trellis comprising a plurality of stages, each stage corresponding to a symbol time and comprising a plurality of nodes, each node having a node state comprising a candidate received symbol value for the node and one or more predecessor candidate received symbol values. The method further includes identifying a sequence of most likely symbol values corresponding to the received signal by evaluating cumulative state metrics for the nodes according to maximum-likelihood sequence estimation or decision-feedback sequence estimation criteria. The forming of the trellis comprises selecting, for each node of the trellis, a set of fan-out branches for the node by identifying, of all possible state transition branches from the node to successor nodes in the succeeding stage, those state transition branches that have a spherical branch metric less than a pre-determined metric limit. The forming of the trellis further comprises determining the cumulative state metric for each node as a function of the cumulative state metrics for predecessor nodes in the preceding stage and the spherical branch metrics for fan-out branches connecting the predecessor nodes to the node.

In some particular embodiments of the invention, selecting the set of fan-out branches for a given node comprises calculating a bias parameter for the node as a function of the node state and a measured channel response, calculating an innovation parameter for the node by subtracting the bias parameter from a received signal value, and calculating a fan-out center value for the node as a function of the innovation parameter and the channel response. In these embodiments, the spherical branch metric for a state transition branch between the node and a given node in the succeeding stage is calculated as a function of the channel response, the fan-out center value, and a candidate symbol value corresponding to the given node in the next stage. In some of these embodiments, the received signal comprises a multiple-input, multiple-out (MIMO) signal, in which case the candidate received symbol values, predecessor candidate symbol values, bias parameters, innovation parameters, and fan-out center values may be represented as vector values.

In some embodiments, a pre-filter response is determined as a function of the measured channel response and the received signal is filtered, using the pre-filter response, to obtain the received signal values used in forming the trellis. In some of these and in various other embodiments, selecting the set of fan-out branches for a given node may comprise performing a tree search among candidate state transition branches based on calculating partial sums of a spherical branch metric formulation and comparing the partial sums to the pre-determined metric limit.

In still other embodiments, soft values are obtained for a bit value of an identified most likely symbol value by regenerating a state transition branch corresponding to the reverse of the bit value and not previously included in the set of fan-out branches for any node in the trellis, calculating a regenerated spherical branch metric for the regenerated state transition branch, and comparing the cumulative state metric corresponding to a best path through the trellis, given the identified most likely symbol value, to an alternative cumulative state metric corresponding to an alternative path through the trellis, given the reverse of the bit value. The alternative path includes the regenerated state transition branch and the alternative cumulative state metric includes the regenerated spherical branch metric. In some of these embodiments, the regenerated spherical branch metric is calculated by computing the regenerated spherical branch metric as a function of the channel response, the fan-out center value corresponding to the source node for the regenerated state transition branch, and a candidate symbol value corresponding to the target node of the regenerated state transition branch.

In alternative embodiments, a soft value is generated for a bit value of an identified most likely symbol value by identifying a best path through the trellis, given the most likely symbol value, determining that an alternative path through the trellis, given the reverse of the bit value, is missing at least one state transition branch, responsive to said determining, calculating the soft value as a function of the pre-determined metric limit, without calculating a spherical branch metric for the missing at least one state transition, branch.

Further embodiments of the present invention include wireless receiver apparatus configured to carry out one or more of the inventive equalization techniques described herein, including in particular equalization circuits configured to carry out one or more of the above-described methods. Of course, those skilled in the art will appreciate that the present invention is not limited to the above features, advantages, contexts or examples, and will recognize additional

DETAILED DESCRIPTION

Figure 1:
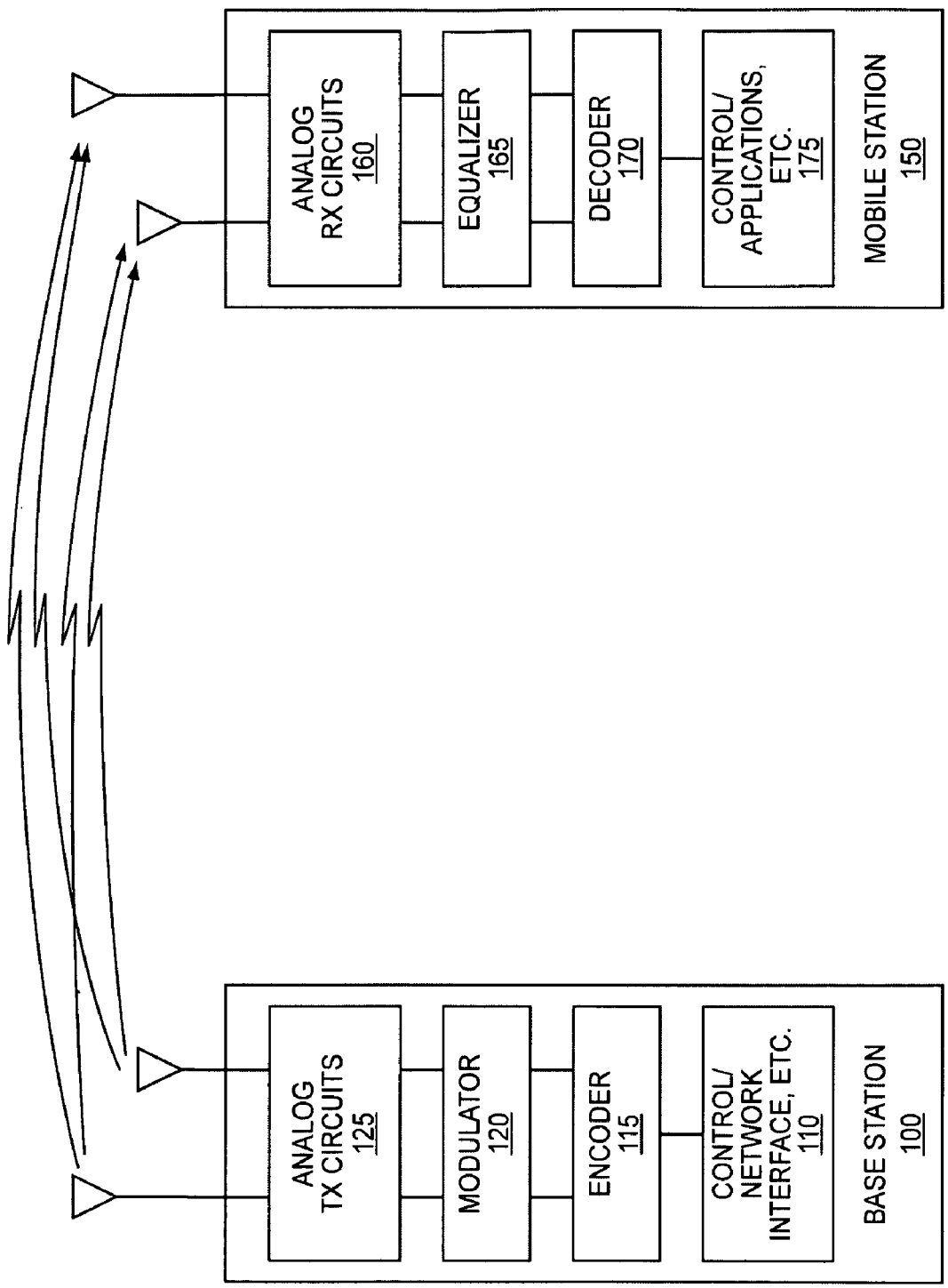
FIG. 1 is a block diagram of a MIMO wireless communication system, including a base station and exemplary mobile station.

Although embodiments of the present invention are described herein with respect to multiple-input multiple-output (MIMO) systems, those skilled in the art will recognize that the inventive techniques disclosed and claimed herein are not so limited and may be advantageously applied to a wide array of receivers. Furthermore, the use of the term "exemplary" is used herein to mean "illustrative," or "serving as an example," and is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement, unless the context clearly indicates otherwise.

Generally speaking the present disclosure provides techniques for equalizing a received signal in a MIMO system with channel dispersion. The disclosed equalizer has a decision feedback sequence estimator (DFSE) structure with modifications based on so-called sphere decoding techniques. Hence, the disclosed equalizer system is called spherical DFSE, or SDFSE, herein.

As is well known to those skilled in the art, the DFSE is a very effective approximation to the maximum likelihood sequence estimator (MLSE), which in turn is the optimal equalizer in a certain sense. A key advantage of the DFSE is its significantly reduced complexity in comparison to the MLSE, even while providing comparable performance. The DFSE has been deployed in a variety of receiver types, with a variety of signal modulations. In particular, it has been applied effectively to the GSM standard and its EDGE evolution to 8PSK modulation.

Sphere decoding, on the other hand, is an effective low-complexity search technique which has been used in the demodulation of very large constellations or MIMO signals. In its conventional form, sphere decoding is applicable only to non-dispersive channels. With the introduction of larger modulation constellations and advanced antenna techniques into newer standards, it has become even more important to design new equalizers, with further complexity reduction, while still maintaining good performance. The SDFSE addresses this goal by combining the advantages of the DFSE and sphere decoding.

In a typical MIMO system, the received signal is subjected to inter-symbol interference (ISI). This may be due to the combined effects of partial response signaling and filtering at the transmitter, multi-path dispersion over the wireless channel, and filtering at the receiver. Those skilled in the art will appreciate that if the transmission system includes coded modulation, then the equalizer can also be adjusted to handle that as well, as a form of ISI. For simplicity, the following description below will assume un-coded modulation; those skilled in the art will appreciate that the inventive techniques disclosed herein may be readily adapted to receivers for processing coded modulation signals.

The downlink (transmissions from a base station to a mobile station) may be considered without much loss of generality. Often, a MIMO system is viewed as consisting of signals transmitted from several antennas at a single base station, where each of the transmitted signals is intended for a single mobile terminal. However, from a receiver perspective this is not fundamentally different from a scenario where some of the multiple transmitted signals seen at the receiver are in fact co-channel interferers transmitted by other base stations and intended for other terminals. Jointly demodulating interferers along with desired signals is the ultimate form of interference cancellation. Thus the present invention addresses both the MIMO scenario and the interference cancellation scenario.

FIG. 1 is a simplified diagram of a wireless communications system employing MIMO techniques to transmit one or more data streams from a base station 100 to a mobile terminal 150. Base station 100 includes analog transmitter (TX) circuits 125, a modulator circuit 120, an encoder circuit 115, and control & network interface circuitry 110. Further details of the base station 100 are unnecessary to fully understand the present invention, and thus are not presented here.

Mobile station 150 includes analog receive (RX) circuits 160, equalizer 165, decoder 170, and control circuit 175. The illustration of mobile terminal 150 in FIG. 1 depicts functional elements of the terminal's receiver. In contrast, several physical elements of an exemplary baseband processing circuit 200 are pictured in FIG. 2. Those skilled in the art will appreciate that the baseband processing circuit 200, which includes one or more microprocessors 210, one or more digital signal processors 220, other digital hardware 230, and memory 240, can be configured with appropriate program code to carry out many baseband processing functions, including the equalizer, decoder, and control circuit functions illustrated in FIG. 1.

In particular, one or more of microprocessors 210 or signal processors 220 may be configured with appropriate program code, as necessary, to carry out the equalization techniques described herein. Thus, memory 240 may include equalizer/decoder code 242, as well as application code 244, other program code 246, and program data 248. Those skilled in the art will further appreciate that memory 240 may comprise several devices and/or several types of memory, including read-only memory, flash memory, random-access memory, optical storage devices, and the like. The components of baseband processing circuit 200 may comprise several separate integrated circuits, or may be integrated into one or more application-specific integrated circuits (ASICs) according to known techniques.

Generally speaking mobile station 150 and baseband processing circuit 200 may be configured to operate in one or several types of wireless networks, according to one or more wireless standards. Appropriate circuit configurations, protocol software, and the like are well known to those skilled in the art, and details of those circuit configurations and software are not necessary to a full understanding of how to make and use the present invention. The equalization techniques described herein may be implemented in any of a variety of mobile terminal types, using any of a variety of circuit configurations including those illustrated generally in FIG. 2.

Figure 2:
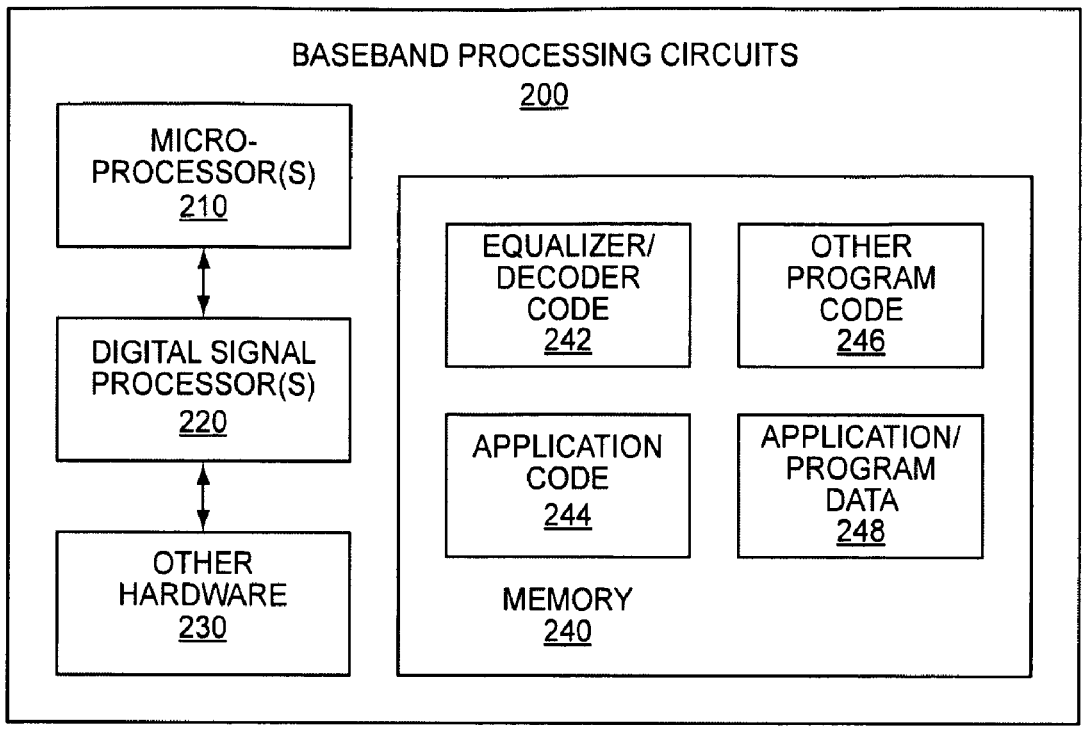
FIG. 2 is a block diagram of a baseband processing circuit according to some embodiments of the invention.

With the context of FIGS. 1 and 2 in mind, the details of the spherical decision-feedback sequence estimator are discussed below. First, consider the general MIMO demodulation problem, given L transmit antennas and N receive antennas. Referring again to FIG. 1, base station 100, with L=2 transmit antennas, is transmitting signals to mobile station 150, with N=2 receive antennas. More generally, the transmitted and received signals may be represented by the vectors $S=(s_1, \ldots, s_L)^T$ and $r=(r_1, \ldots, r_N)^T$, respectively.

To introduce the inventive techniques of the present invention, the following discussion first assumes that the radio propagation channel between the transmitter and receiver is non-dispersive. The channel can be represented by the N×L matrix H, where the complex-valued element $H_{ij}$ represents the channel from transmit antenna j to receive antenna i. Later, the general dispersive channel case is considered.

The system model for the MIMO transmission system may be given by:

$$r = Hs + v, \quad (1)$$

where $v=(v_1, \ldots, v_N)^T$ represents the noise at the receiver. By default, an additive white Gaussian noise (AWGN) model is used, so that v is a white Gaussian noise vector.

Each component of s is a symbol from a finite modulation constellation (e.g. 16-QAM). The set $\Lambda$ contains all possible transmitted vectors, denoted $\hat{s}=(\hat{s}_1, \ldots, \hat{s}_L)^T$. The size q of $\Lambda$ is the product of the constellation sizes of the L components. That is, if L=2 and both signals use 16-QAM, then q=16·16=256.

Given the system model of Equation (1), the vector $\hat{s}$ in $\Lambda$ that minimizes the noise energy in the system model is the constrained maximum likelihood (ML) estimate, which is given by:

$$\tilde{s}^{ml} = \underset{\hat{s} \in \Lambda}{\operatorname{argmin}}(r - H\hat{s})^H(r - H\hat{s}). \quad (2)$$

In general, finding $\tilde{s}^{ml}$ requires a full search over the set $\Lambda$.

The basic idea of sphere decoding is to search for a solution in a small subset of the most likely candidates in $\Lambda$. The subset must also be easy to define, in the sense of identifying which candidates are in it. Given that the noise may be characterized as AWGN, then the appropriate subset of candidates among which to search for the solution are those candidates that fall within a sphere centered at a preliminary estimate of the transmitted vector. The radius of the sphere is a design parameter, which may be selected to trade off accuracy for complexity. In general, a smaller radius reduces computations, but increases the risk of missing the correct solution. The center of the sphere is the unconstrained maximum-likelihood (UML) estimate of $\hat{s}$, given by:

$$\tilde{s}^{uml} = (H^H H)^{-1} H^H r. \quad (3)$$

For the remainder of the present disclosure, it is assumed that there are at least as many receiver antennas as transmitter antennas in the system, i.e., $N \geq L$. This implies that the inverse of the channel matrix product $H^H H$ exists, except in pathological cases. However, those skilled in the art will appreciate that the case $N \leq L$ can be handled in a similar way to that described herein by using a pseudo-inverse.

Note that the argument of the minimum value function in Equation (3) can be written as:

$$\|r - H\hat{s}\|^2 = (\hat{s} - \tilde{s}^{uml})^H H^H H(\hat{s} - \tilde{s}^{uml}) + r^H (I - H(H^H H)^{-1} H^H) r, \quad (4)$$

where $\|x\|$ is the Euclidean norm of the vector x. Those skilled in the art will recognize that the second term of Equation (4) does not depend on $\hat{s}$, and thus is irrelevant to the minimization function. So, $\tilde{s}_{ML}$ can be written as:

$$\tilde{s}^{ml} = \underset{\hat{s} \in \Lambda}{\operatorname{argmin}}(\hat{s} - \tilde{s}^{uml})^H H^H H(\hat{s} - \tilde{s}^{uml}). \quad (5)$$

The search for $\tilde{s}_{ML}$ is limited to those candidates in a subset $\Lambda_\rho$ of $\Lambda$, delimited by a sphere of radius $\rho$ centered at $\tilde{s}^{uml}$:

$$\Lambda_\rho = \{\hat{s} \in \Lambda : (\hat{s} - \tilde{s}^{uml})^H H^H H(\hat{s} - \tilde{s}^{uml}) \leq \rho^2\}. \quad (6)$$

The sphere decoder is fully described, conceptually, by Equations (1) to (6). However, this conceptual description does not explain how a particular candidate $\hat{s}$ may be identified as being in or out of the subset $\Lambda_\rho$, without doing a lot of work. Matrix decomposition, to be discussed next, may be used to aid the computation of $\tilde{s}^{uml}$ in Equation (3), and also enables the identification of $\hat{s}$ using a sequence of simple steps.

In one approach, matrix decomposition is applied to the channel matrix product $H^H H$. Other approaches apply matrix decomposition to H, with the same general effect. Here, the Cholesky method is used to obtain an upper triangular matrix U such that:

$$H^H H = U^H U. \quad (7)$$

The triangular structure of U makes its inversion trivial. More importantly, now the argument of Equation (5) can be re-written as:

$$(\hat{s} - \tilde{s}^{uml})^H U^H U (\hat{s} - \tilde{s}^{uml}) = \sum_{i=1}^{L} u_{ii}^2 \left| \hat{s}_i - \tilde{s}_i + \sum_{j=i+1}^{L} \frac{u_{ij}}{u_{ii}} (\hat{s}_j - \tilde{s}_j) \right|^2 \leq \rho^2, \quad (8)$$

where $\tilde{s}_i$ denotes a component of $\tilde{s}^{uml}$, and $u_{ij}$ denotes a component of U. Here it is assumed without much loss of generality that $u_{ii} \neq 0$. Since every term in the outer sum in Equation (8) is non-negative, the constraint of Equation (8) also applies to the partial sum, denoted P(T), starting at any value T:

$$P(T) = \sum_{i=T}^{L} u_{ii}^2 \left| \hat{s}_i - \tilde{s}_i + \sum_{j=i+1}^{L} \frac{u_{ij}}{u_{ii}} (\hat{s}_j - \tilde{s}_j) \right|^2 \leq \rho^2. \quad (9)$$

The partial sum property enables a depth-first search on a tree structure. In the following, only the main steps of this approach are sketched. Those skilled in the art will appreciate that there are many variants of this search in the literature, including various enhancements such as the reuse of computations, or the ordering of nodes to visit the most promising sub-trees first, etc.

First, the partial sum P(L) may be used to obtain a constraint on $\hat{s}_L$, i.e.:

$$P(L) = u_{LL}^2 |\tilde{s}_L - \hat{s}_L|^2 \leq \rho^2. \quad (10)$$

If $\hat{s}_L$ belongs to a regular modulation constellation, such as ASK, PSK or QAM, then enumerating the points satisfying the constraint of Equation (10) is easy, as described in B. Hochwald and S. ten Brink, "Achieving near-capacity on a multiple-antenna channel," IEEE Transactions on Communications, vol. 51, pp. 389-99, March 2003.

Next, one of the candidates $\hat{s}_L$ that satisfies P(L) is substituted into P(L-1), to identify the candidates $\hat{s}_{L-1}$. Similarly, the same candidate for $\hat{s}_L$ and one of the candidates for $\hat{s}_{L-1}$ are substituted into P(L-2) to identify the candidates $\hat{s}_{L-2}$, and so on. Eventually, a complete vector solution $\hat{s} = (\hat{s}_1, \ldots, \hat{s}_L)^T$ that satisfies Equation (8) is obtained. This becomes the current candidate solution for $\tilde{s}^{ml}$, and will remain so, until and unless another solution that is closer to $\tilde{s}^{uml}$ is found and replaces it.

The search continues in a depth first manner. Once a candidate $\hat{s}$ that meets the constraints imposed by the sphere is found, the search backs up one step. Thus, for the same candidates $\hat{s}_2, \ldots, \hat{s}_M$, other candidates for $\hat{s}_1$ are checked. The search then backs up two steps, and other candidates for $\hat{s}_2$ are checked, given the same candidates $\hat{s}_3, \ldots, \hat{s}_M$, and so on. Note that it is possible that for some value of T and some values $\hat{s}_{T+1}, \ldots, \hat{s}_L$ there are no symbols $\hat{s}_T$ that satisfy P(T). In this case the search backs up a step, to test another value for $\hat{s}_{T+1}$, and looks again for candidates for $\hat{s}_T$. If none of the of the values work, the search backs up an additional step, testing another value for $\hat{s}_{T+2}$ and looking again for candidates for $\hat{s}_{T+1}$, and so on. If the radius $\rho$ is too small, it is possible that nothing works and that a complete vector solution $\hat{s}$ cannot be found. In that case, the radius can be increased, and the search started over.

Figure 3:
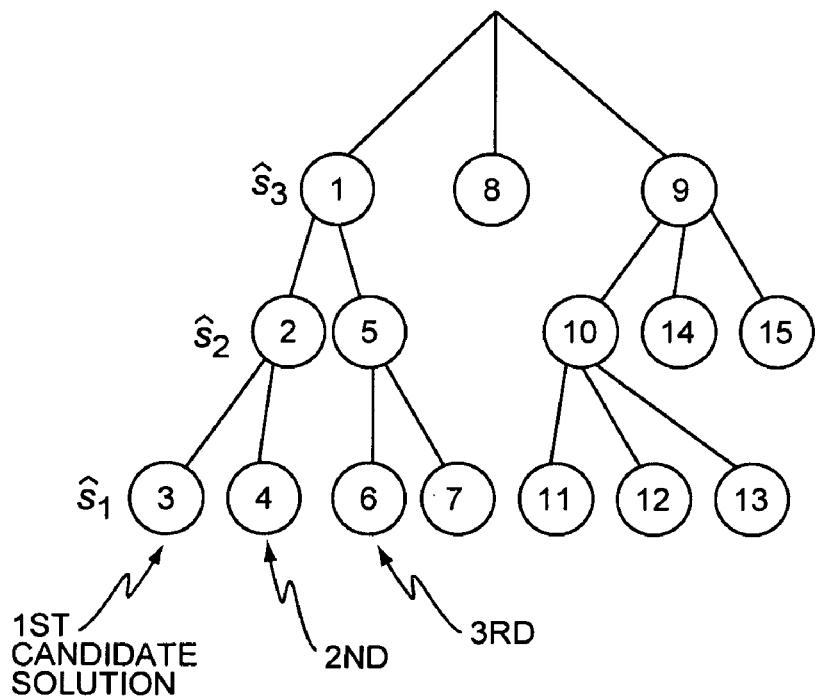
FIG. 3 illustrates a tree search process for identifying candidate received symbols.

FIG. 3 may be used to illustrate the depth-first tree search. FIG. 3 illustrates a search for the case L=3, where a left-first search is used. The node labels in FIG. 3 indicate the search order. For T=3, three candidates for $\hat{s}_3$ are found. Taking the left-most of these first (node 1), two candidates for $\hat{s}_2$ are found. Again taking the left-most node first (node 2), two candidates for $\hat{s}_1$ are found. The left-most of these candidates (node 3) completes the first full candidate solution, which becomes the current candidate solution for $\tilde{s}^{ml}$. Backing up one step node 2, taking the second value of $\hat{s}_1$ (node 4) completes the second candidate solution. If it is closer to $\tilde{s}^{uml}$ than the first solution, then it replaces the first candidate as the current candidate solution for $\tilde{s}^{ml}$. Next the search backs up two stages, to node 1, taking the second solution for $\hat{s}_2$ (node 5), and so on.

Those skilled in the art will note that for the second solution for $\hat{s}_3$ (node 8), there are no candidates for $\hat{s}_2$ that satisfy P(2), so the path ends. Similarly, for nodes 14 and 15, there are no values for $\hat{s}_1$ that satisfy the full constraint P(1), so again the paths end.

The general sphere-decoding search described above may be accelerated further by shrinking the radius of the sphere as the search progresses. By construction, the distance between the current candidate solution $\hat{s}$ and $\tilde{s}^{uml}$ cannot exceed $\rho$. If the actual distance for the current candidate solution is smaller than $\rho$, then that distance can be substituted for $\rho$, establishing a new sphere radius, since only candidates that are closer to the sphere's center than the current candidate solution are of interest. This will accelerate the search because the reduced $\rho$ shrinks the sphere, eliminating borderline candidates.

Now that general sphere decoding principles have been illustrated, the MIMO system model in Equation (1) is generalized to include the effects of inter-symbol interference (ISI). To accommodate this, the notation is slightly modified. First, the single channel matrix H of the non-dispersive case is now denoted $H_0$. For a symbol-spaced channel with memory M, there are M channel matrices $H_M, \ldots, H_1$ in addition to the matrix $H_0$. Here, the element $H_{l,ij}$ of $H_l$ describes the channel from transmit antenna j to receive antenna i at a delay of l symbols. The current transmitted signal s is now denoted $s_k$, and the system model becomes $$r_k = H_M s_{k-M} + \ldots + H_1 s_{k-1} + H_0 s_k + v_k. \quad (11)$$

The channel matrices can be assumed to be constant over the duration of a burst of data, which will be equalized in one shot.

A high level description of the maximum-likelihood sequence estimator (MLSE) is now provided, to facilitate the description of the decision-feedback sequence estimator and of the spherical decision-feedback sequence estimator (SDFSE). In the earlier non-dispersive scenario, the maximum-likelihood (ML) estimate represented by Equation (2) yielded symbols independently, i.e., one at a time. Because of inter-symbol interference, the received value at a given time depends not only on the transmitted value for the current symbol, but also on values of previously transmitted symbols. Thus, the best sequence of symbols must be found simultaneously, solving a generalized version of Equation (2). The MLSE is an effective method for finding the best sequence.

Figure 4:
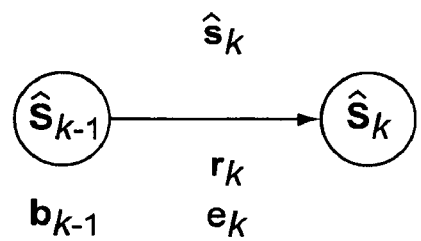
FIG. 4 illustrates a state transition in an inter-symbol interference trellis.

A full-blown MLSE operates on a trellis with $q^M$ states and $q^{M+1}$ branches per stage. For the discussion that follows, the labeling convention shown in FIG. 4 is used. At time k, the received value $r_k$ is compared to synthesized received values on the trellis. The state at time k represents a sequence of M symbols:

$$\hat{S}_k = (\hat{s}_{k-M+1}, \ldots, \hat{s}_k), \quad (12)$$

and stage k of the trellis describes the progression from state $\hat{S}_{k-1}$ to state $\hat{S}_k$. Thus, the branch from $\hat{S}_{k-1}$ to $\hat{S}_k$ represents the most current symbol (vector) $\hat{s}_k$. Note that for the ISI trellis, all branches ending in $\hat{S}_k$ share the same symbol $\hat{s}_k$.

For notational simplicity, the states at each stage may be indexed 0 to $q^M - 1$. Each index represents a distinct value of $\hat{S}_k$. A branch is labeled by its starting and ending state pair (j', j). For each state j, the fan-in I(j) and the fan-out O(j) are the set of incoming and outgoing branches, respectively. For the ISI MLSE trellis, all fan-in and fan-out sets have the same size q.

In order to facilitate the introduction of sphere decoding ideas later, the workings of the MLSE are described in terms of bias and innovation. For each state $\hat{S}_{k-1}$, the bias (vector) is given by:

$$b_{k-1} = H_M \hat{s}_{k-M} + \ldots + H_1 \hat{s}_{k-1}. \quad (13)$$

This bias represents the effect of this particular state on the decision process. Removing the bias term from the received value yields the innovation (vector):

$$c_k = r_k - b_{k-1}. \quad (14)$$

This innovation represents the residual received value at state $\hat{S}_k$ after removing the bias of state $\hat{S}_{k-1}$.

For each branch in the fan-out of $\hat{S}_{k-1}$, the innovation $c_k$ is compared to the corresponding branch symbol weighted by the channel tap, to obtain a branch metric:

$$e_k = \|c_k - H_0 \hat{s}_k\|^2. \quad (15)$$

This branch metric may be explicitly labeled with the corresponding branch where necessary.

Without much loss of generality, it can be assumed that the trellis starts at time 0 in state 0. The state metric computation proceeds forward from there. At time k, the state metric, or cumulative state metric, $E_k(j)$ of state j is given in terms of the state metrics at time k−1 and the branch metrics at time k:

$$E_k(j) = \min_{j' \in I(j)} (E_{k-1}(j') + e_k(j', j)). \quad (16)$$

In addition, the state in I(j) that achieves the minimum is the called the predecessor of state j, and denoted $\pi_{k-1}(j)$. Also, the oldest symbol $\hat{s}_{k-M}$ in the corresponding M-tuple $\hat{S}_{k-1} = (\hat{s}_{k-M}, \ldots, \hat{s}_{k-1})$ is the tentative symbol decision looking back from state j at time k.

Furthermore, it is possible to trace back a sequence the states to time 0, by following the chain $\pi_{k-1}(j)$, $\pi_{k-2}(\pi_{k-1}(j))$, etc. The corresponding symbols $\hat{s}_{k-M}$, $\hat{s}_{k-M-1}$, etc, are the tentative decisions of the MLSE looking back from state j at time k. In general, looking back from different states at time k, the decisions tend to agree more the older the symbols. That is, the longer the delay for a decision, the better. Typically, there is a chosen delay D, and the final decision about symbol $\hat{s}_{k-M-D}$ is made by tracing back from the state $\hat{S}_k$ with the smallest state metric.

With the preceding description of the MLSE in mind, the DFSE may now be described. The DFSE memory M'<M is a design parameter. Thus, the DFSE trellis is the same as a MLSE trellis with $q^{M'}$ states.

Referring to Equation (13), the symbols $\hat{s}_{k-M}, \ldots, \hat{s}_{k-1}$ are needed to compute the bias. However, the state in the DFSE represents only the M' most recent symbols:

$$\hat{S}_{k-1} = (\hat{s}_{k-M'}, \ldots, \hat{s}_{k-1}). \quad (17)$$

In order to produce the older (M−M') symbols, tentative symbol decisions, as explained earlier for the MLSE, are used. That is, the tentative decisions are produced by tracing back from a particular state $\hat{S}_{k-1}$, following the chain of predecessor states. These tentative decisions are denoted:

$$\overline{S}_{k-M'-1} = (\overline{s}_{k-M}, \ldots, \overline{s}_{k-M'-1}). \quad (18)$$

Once these tentative decisions are produced, then the bias can be computed using $\hat{S}_{k-1}$ and $\overline{S}_{k-M'-1}$. This in turn enables the computation of the innovation and the branch metric. The rest of the process proceeds as before.

As explained earlier, the more delayed the decisions, the better. Accordingly, the tentative decision $\overline{S}_{k-M'-1}$ may be relatively unreliable. Nevertheless, it is better to use all information at hand. Furthermore, a pre-filter may be used to mitigate the impact of occasional tentative symbol decision errors on branch metric computations. The advantages of a pre-filter can be seen by recognizing that the bias computation becomes less sensitive to $\overline{S}_{k-M'-1}$ if the energy in the elements of the lagging channel matrices is small. In practice, a given instance of the channel response may or may not have this desirable feature. A pre-filter may be used to shape the received signal so that the filtered signal has the desired characteristics.

Figure 5:
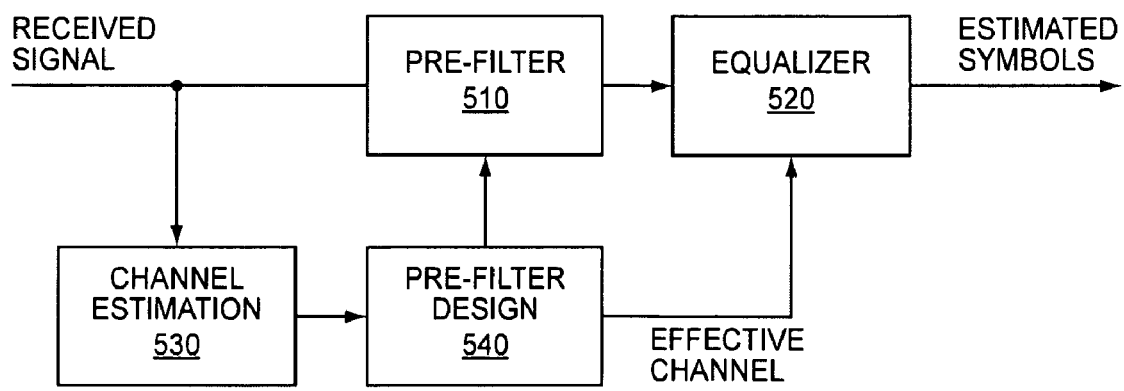
FIG. 5 illustrates an exemplary receiver configuration including an equalizer and pre-filter.

FIG. 5 illustrates the basic structure of a receiver utilizing a pre-filter. A down-converted, sampled, received signal is passed through a pre-filter 510 before being supplied to the equalizer 520. The pre-filter 510 is configurable, according to parameters computed by pre-filter design unit 540, based on an estimate of the propagation channel conditions obtained by channel estimation 530. The pre-filter response is thus designed on the fly, for each realization of the channel response. DFSE performance can thus be enhanced with an effectively configured pre-filter, which generally produces an effective channel response by "pushing" energy towards the leading channel matrices. The effective channel response is the convolution of the original channel response and the pre-filter, and may have a larger memory than the original, but with more of its energy in the leading taps. The MIMO pre-filter was studied in A. Hafeez, R. Ramesh and D. Hui, "Maximum SNR prefiltering for MIMO systems," IEEE Workshop on Signal Processing Advances in Wireless Communications, 2005.

The DFSE as describe above is an effective method for reducing the state space of the trellis in comparison to the MLSE. However, as described above, it does not reduce the fan-in and fan-out of each state, compared to the MLSE. The spherical decision-feedback sequence estimator (SDFSE) described herein has reduced complexity compared to the DFSE, while still maintaining good performance. The effect of the introduction of sphere decoding techniques to the DFSE is to reduce the fan-in and fan-out of the DFSE states. As explained in more detail below, this reduction focuses the trellis search on the most promising symbol sequences, and avoids wasting computations on unlikely sequences.

In the SDFSE, the comparisons related to state transitions are restricted to only the most likely branches of the full trellis. For clarity, the description of the SDFSE that follows refers to the underlying "full" DFSE trellis. Conceptually, the SDFSE trellis can be viewed as a reduced version of the DFSE trellis, obtained by "pruning" undesired branches from the underlying full trellis. Of course, in reality, the sparse trellis of the SDFSE is built by adding branches to an "empty" trellis, and not by pruning DFSE branches from a full trellis.

Recall from Equation (14) that for each index j' of state $\hat{S}_{k-1}$, the bias $b_{k-1}$ is removed from the received value $r_k$ to yield the innovation $c_k$. In the DFSE, the branch metric $e_k(j', j)$ compares the innovation $c_k$ to the weighted symbol for each of the q branches (j', j) whose ending state j is in the fan-out j'. In the SDFSE, the innovation $c_k$ is thus used to define the center of a sphere, and the branches are constrained according to a spherical constraint. This results in a sparse trellis with fewer computations than required for a full DFSE trellis.

The triangular matrix U is obtained by Cholesky decomposition of $H_0$, and used for the whole trellis. Similarly to Equation (3), an unconstrained maximum-likelihood estimate of the transmitted symbol at time k may be defined as:

$$\tilde{s}^{uml} = (H_0^H H_0)^{-1} H_0^H c_k. \quad (19)$$

which depends on j' via $c_k$. Next, $e_k(j', j)$ from the DFSE may be replaced with a spherical branch metric:

$$f_k(j', j) = (\hat{s}_k - \tilde{s}^{uml})^H U^H U (\hat{s}_k - \tilde{s}^{uml}). \quad (20)$$

The subset $O_\rho(j')$ of the fan-out O(j'), as restricted by ρ, may be defined as:

$$O_\rho(j') = \{j \in O(j') : f_k(j', j) \leq \rho^2\}. \quad (21)$$

Figure 6:
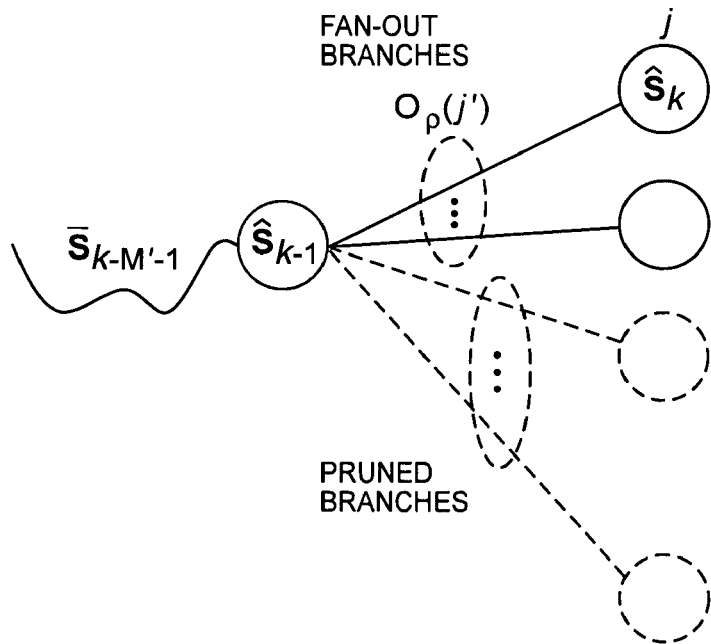
FIG. 6 illustrates the conceptual "pruning" of trellis branches according to the inventive techniques of the present invention.

Those skilled in the art will appreciate that $O_\rho(j')$ is defined along the same lines as $\Lambda_\rho$ in Equation (6). Conceptually, each branch (j', j) that does not satisfy $O_\rho(j')$ can be regarded as "pruned" from the trellis, as shown in FIG. 6, although in practice a sparse trellis is assembled by adding branches, rather than by pruning branches from a full trellis.

In reality, $O_\rho(j')$ may be constructed directly, in a manner similar to that used to find $\Lambda_\rho$ earlier, by using the partial sum constraint in a similar fashion as in Equation (9):

$$P(T) \leq \rho^2. \quad (22)$$

This allows the use of a depth-first tree search mechanism, like that described earlier. Each time the bottom of the tree is reached at T=1, a new candidate solution $\hat{s}_k$ is generated. If (j', j) denotes the corresponding branch, then by construction, j belongs to $O_\rho(j')$, and (j', j) is allowed on the trellis.

By working our way through the tree, all the candidate solutions $\hat{s}_k$ are eventually identified, and their corresponding branches (j', j) added to the trellis. The fan-out subset $O_\rho(j')$ is updated accordingly. However, at this point is should be noted that there is a significant distinction from the original sphere decoder, in that a decision about the best symbol is not made at this point. In keeping with the trellis decision process, that decision is left to the next stage, as with Equation (16).

As a result of the fan-out restriction for state $\hat{S}_{k-1}$, there is a corresponding fan-in reduction for state $\hat{S}_k$ with respect to the underlying DFSE trellis. The subset $I_\rho(j)$ of $I(j)$ contains the values j' such that j belongs to $O_\rho(j')$. In other words $I_\rho(j)$ contains the states j' in the underlying DFSE fan-in $I(j)$ such that (j', j) is not pruned. The implications of uneven fan-in size are discussed later.

Next, a new cumulative state metric $F_k(j)$ is defined, based on the spherical branch metric and the new restricted fan-in:

$$F_k(j) = \min_{j' \in I_\rho(j)} (F_{k-1}(j') + f_k(j', j)). \quad (23)$$

Now, the other steps are done as described with respect to the DFSE, in terms of the predecessor state, trace back, and symbol decisions, but based on the spherical branch metrics and the modified cumulative state metric $F_k(j)$.

The overall effect of pruning branches from the underlying DFSE trellis is to focus the search of the SDFSE on the most likely sequences. It is instructive to understand how this happens via the sphere restriction on fan-out and fan-in sets. First, recall that all branches starting in a state j' of the underlying DFSE share the same bias $b_{k-1}$, which is generated using the state $\hat{S}_{k-1}$ and the tentative decisions $\overline{S}_{k-M'-1}$. In turn, $b_{k-1}$ affects the innovation $c_k$ and the sphere center $\tilde{s}^{uml}$.

If $\hat{S}_{k-1}$ and $\overline{S}_{k-M'-1}$ are correct, then $\tilde{s}^{uml}$ will be well located, and there is a good chance that the correct symbol corresponds to one of those branches that fall within the fan-out set $O_\rho(j')$. Conversely, errors in either $\hat{S}_{k-1}$ or $\overline{S}_{k-M'-1}$ will affect the bias and innovation calculations, thus causing $\tilde{s}^{uml}$ to be misplaced. This results in a lower likelihood that the correct symbol is among those allowed by $O_\rho(j')$.

Now, consider that all the branches ending in state j of the underlying DFSE share the same symbol $\tilde{s}_k$. Then, a correct value of $\tilde{s}_k$ will generally result in a small modified metric $f_k(j', j)$. Thus, the fan-in $I_\rho(j)$ is expected to be relatively large for those states j that include the correct value of $\tilde{s}_k$. Conversely, an error in $\tilde{s}_k$ will generally result in a large $f_k(j', j)$. Thus, $I_\rho(j)$ is expected to be relatively small for those states j that include an incorrect value of $\tilde{s}_k$. Overall, this un-even "pruning" of branches in the SDFSE has the desired effect of focusing computational resources on the more promising states.

Figure 8:
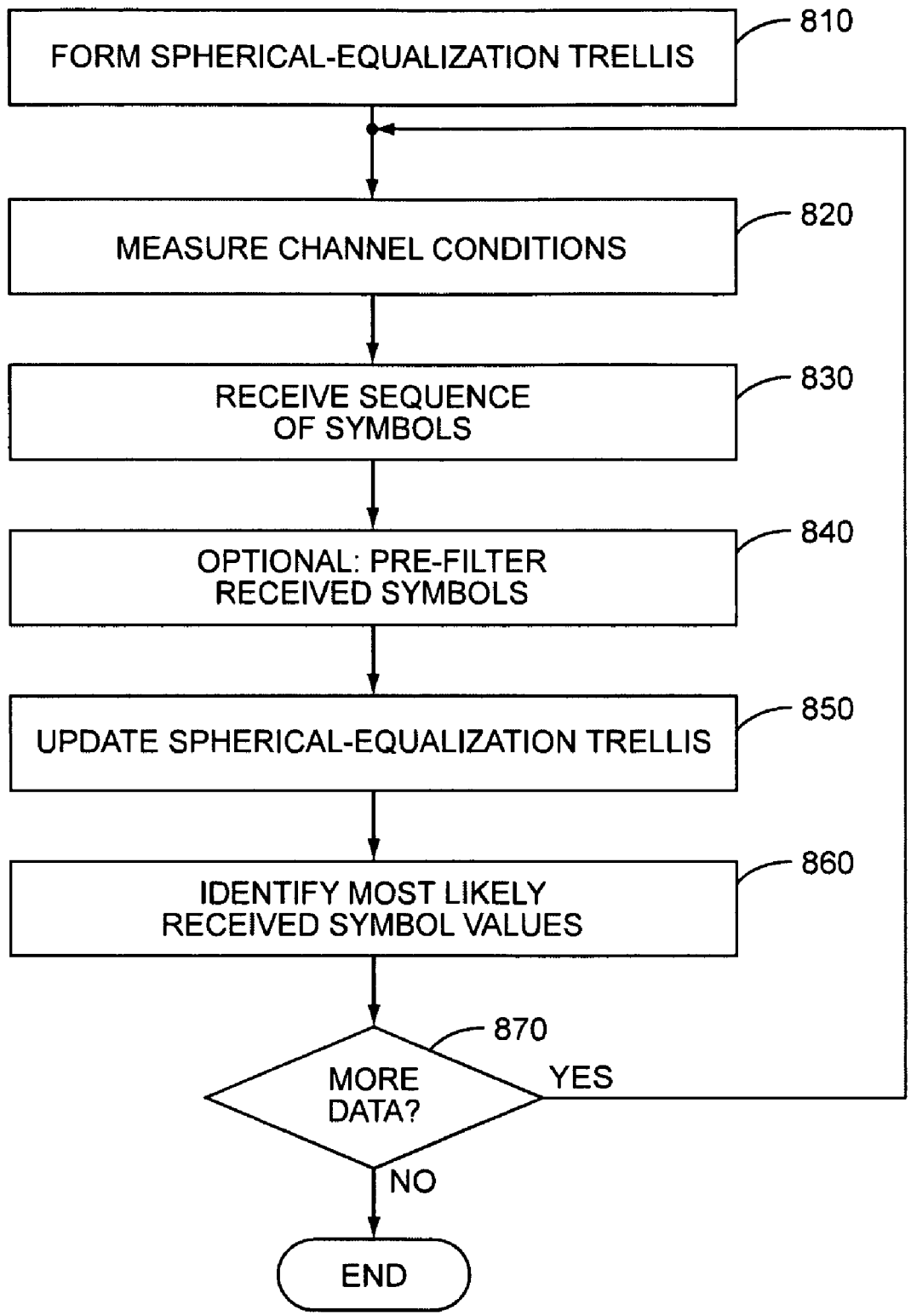
FIG. 8 is a process flow diagram illustrating an exemplary method for equalizing a received signal transmitted through a dispersive channel.

With the above description of the SDFSE in mind, those skilled in the art will appreciate that the process flow diagram of FIG. 8 illustrates a method in a wireless receiver for equalizing a received signal transmitted through a dispersive channel. The process flow begins, as shown at block 810, with the forming of a spherical equalization trellis. The trellis has a plurality of stages, each stage corresponding to a symbol time and each stage having a plurality of nodes. As discussed above, each has a node state, which comprises a candidate received symbol value for the node and one or several predecessor candidate received symbol values.

In general, forming the spherical equalization trellis comprises selecting a set of fan-out branches for each node of the trellis by identifying, from the set of all possible state transition branches from that node to successor nodes in the succeeding stage, those state transition branches that have a spherical branch metric less than a pre-determined metric limit. Then, a cumulate state metric may be determined for each node as a function of the cumulative state metrics for predecessor nodes in the preceding stage and the spherical branch metrics for fan-out branches for the predecessor nodes that correspond to the node (i.e., that are part of the fan-out for the current node).

The spherical-equalization trellis is updated periodically, e.g., on a burst-to-burst basis, as new symbols are received and as channel conditions change. Thus, as shown at block 820, channel conditions are measured for the current burst, and a new sequence of symbols, e.g., corresponding to a transmission burst, are received as shown at block 830. Optionally, as indicated at block 840, the received symbols are pre-filtered, to "push" the energy of the "smeared" symbols forward. As discussed earlier, the pre-filter may be configured on a burst-to-burst basis as a function of the current channel conditions.

At block 850, the spherical-equalization trellis is updated, based on the most recent received symbols and the measured channel conditions. As each new stage is added, a new symbol value can be estimated, as shown at block 860, by tracing back through the trellis to identify the most likely received symbol value (a vector, in a MIMO system) for a symbol time at a given number of symbols prior to the current symbol time k. As indicated at block 870, the updating of the trellis and the estimation of symbol values is repeated so long as new data is received.

Figure 9:
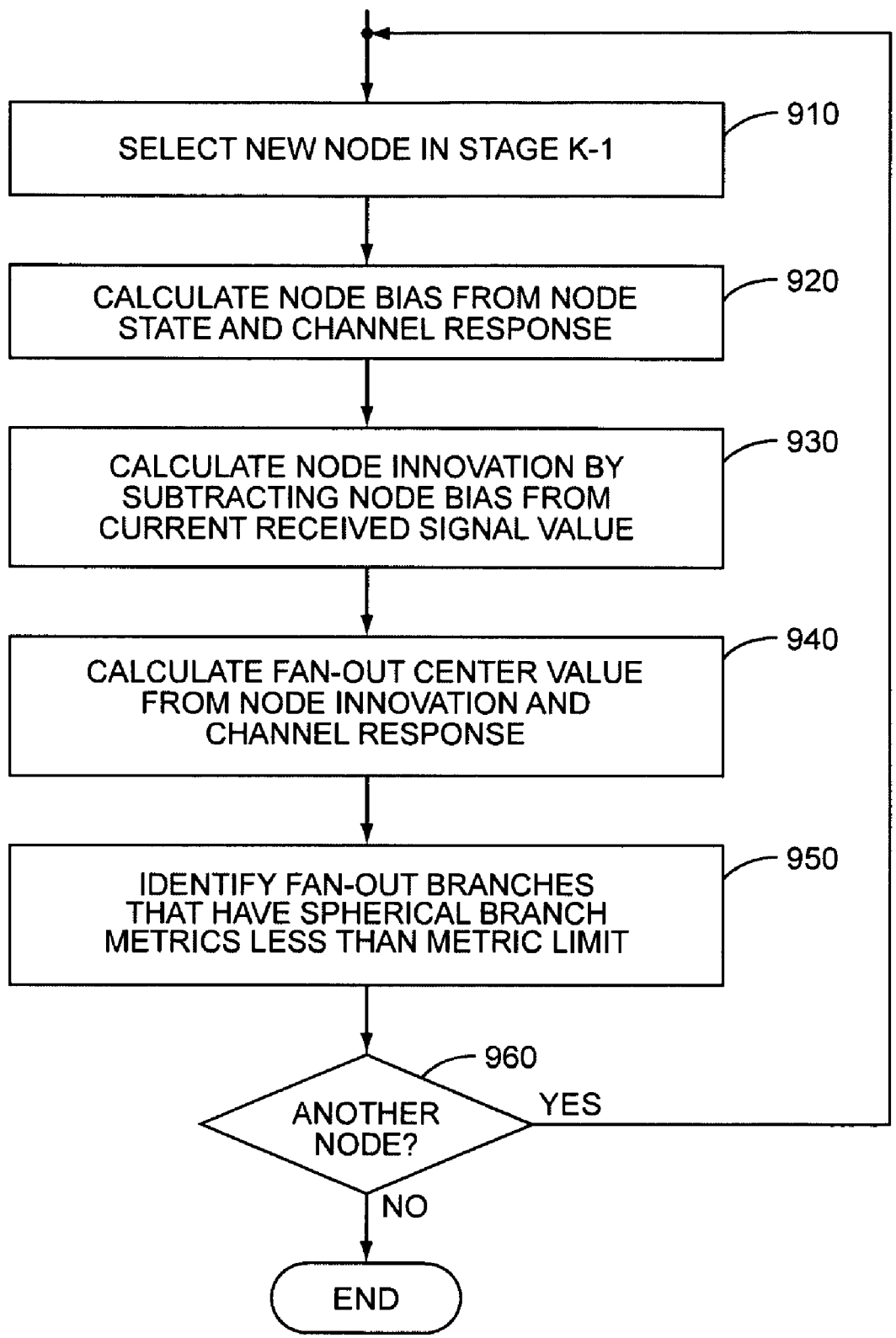
FIG. 9 is a process flow diagram illustrating the selection of fan-out branches for nodes in an ISI trellis, according to some embodiments of the present invention.

Details of an exemplary process for selecting the set of fan-out branches for a given stage is illustrated with the process flow diagram of FIG. 9. The illustrated process applies to the selection of fan-out branches for stage k−1, and thus defines the branches between stage k−1 and stage k. The process thus begins with the selection of one of the nodes in stage k−1, as shown at block 910. Next, as shown at block 920, a node bias parameter is calculated for the node, based on the node state and the measured channel conditions, e.g., by using Equation (13). (As noted above, tentative symbol decisions may be formed to generate the older symbols not explicitly included in the SDFSE node state.) The node bias parameter is then subtracted from the current received signal value, as shown at block 930, to obtain an innovation parameter for the node.

A fan-out center value is calculated from the innovation parameter for the node and the channel response, as shown at block 940, e.g., according to Equation (19). Given that fan-out center value, a set of fan-out branches for the node that have spherical branch metrics less than a pre-determined metric limit are identified, as shown at block 950. In particular, a tree search among candidate state transition branches may be performed, based on the calculating of partial sums of a spherical branch metric formulation and the comparing of the partial sums to the pre-determined metric limit. As discussed above, the spherical branch metrics for each state transition branch between the node and a given node in the succeeding stage are calculated as a function of the channel response, the fan-out center value, and a candidate symbol value corresponding to the given node in the next stage, e.g., as shown in Equation (20). The pre-determined metric limit used to constrain the fan-out set may in some embodiments be generated as a result of simulation by the receiver's manufacture, and stored in memory for run-time use. Those skilled in the art will appreciate that the pre-determined metric limit may be dynamically adapted, in other embodiments, based on such factors as the prevailing channel conditions, previous receiver performance (e.g., error rate), or the like.

As indicated at block 960, the process is repeated for each node in the stage k−1. Given the spherical branch metrics, a cumulative state metric may be determined for any given node (e.g., in stage k) as a function of the cumulative state metrics for predecessor nodes in the preceding stage (e.g., stage k−1) and the spherical branch metrics for fan-out branches for the predecessor nodes that lead to the given node. These cumulative state metrics may in turn be used to estimate the most likely sequence of received symbols, as in a conventional DFSE.

In the regular trellis of a DFSE (as well as in an MLSE), it is straightforward to extract a soft value for each bit in addition to the hard decision. One simple and very effective technique can be referred to as "cheap soft value estimation" or "cheap SOVA." This approach will serve as the baseline for a discussion of soft value estimation in the SDFSE, and is thus described briefly below.

First, assume that the trellis has been traced back from its end to the start, determine the best path. Next, suppose that the indices j and j' correspond to the best states at indices k and k−1. Now, recall that symbol estimation effectively involves making a decision about the earliest symbol value $\hat{s}_{k-M'}$ of $\hat{S}_{k-1}$ corresponding to j'. For each bit of $\hat{s}_{k-M'}$, the "best" branch among those with the reverse of that bit value is selected. The cumulative metric corresponding to that predecessor node is then subtracted from the best metric for the node under consideration to yield the cheap SOVA soft value for the bit. Those skilled in the art will note that due to the regular structure of the DFSE trellis, half the branches in I(j) will have the same bit value. In addition, all the soft values of a burst can be scaled according to the signal-to-noise ratio (SNR) for that burst. This is relevant in particular in systems that use frequency hopping, where each burst among those that contribute to a codeword may experience a significantly different SNR. This is also relevant to systems where interference levels change significantly among bursts contributing to the same codeword. This includes packet data systems where due to scheduling of different users, interference levels vary dramatically from burst to burst.

The cheap SOVA estimation technique may be extended to the irregular SDFSE trellis. As before, (j', j) is the best branch leading to state j at index k. Again, it should be recalled that the symbol estimation process involves making a tentative decision about the earliest symbol value $\hat{s}_{k-M'}$ of $\hat{S}_{k-1}$ corresponding to j'. However, unlike the DFSE, in the SDFSE the subset of $I_\rho(j)$ with a certain bit value of $\hat{s}_{k-M'}$ reversed may be empty.

Figure 7:
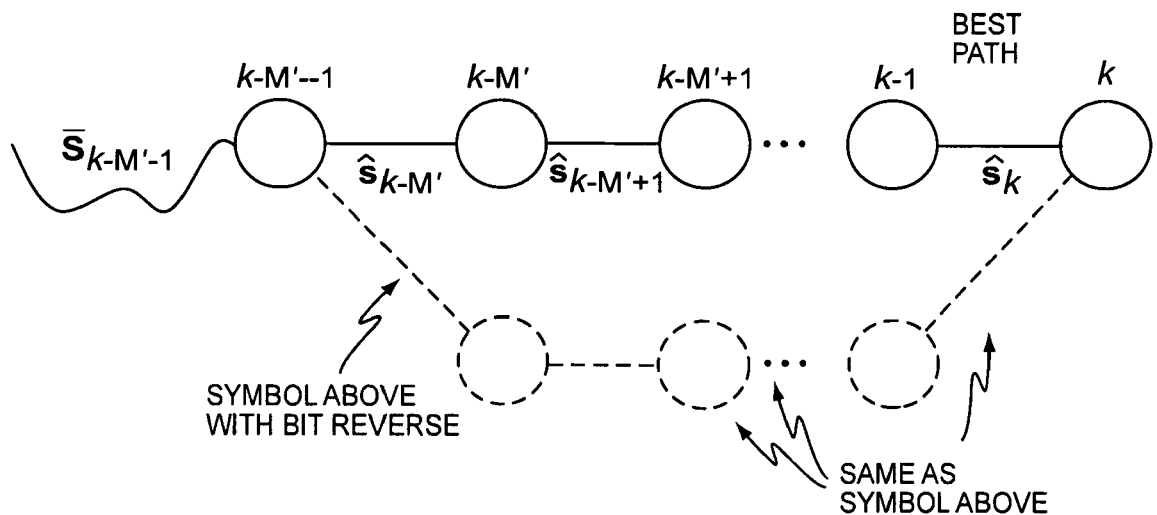
FIG. 7 illustrates the regeneration of a trellis path to form soft bit values for an estimated most likely symbol, according to some embodiments of the invention.

One approach in this case is to grow the missing branch or branches to create the desired comparison. The most likely error event is the shortest, which here is of length M'+1. Such an event corresponds to an error in the first symbol $\hat{s}_{k-M'}$, and no errors in the following M' symbols. The construction of such an event on the SDFSE trellis is shown in FIG. 7. Begin with the node of interest at stage k, the trellis is traced back to the best state at index k−M'−1. The trellis is then traced forward by following the path that corresponds to a bit-reversed version of $\hat{s}_{k-M'}$, i.e., with the bit of interest reversed. The trace forward continues by following the unchanged remaining symbols of $\hat{S}_{k-1}$. The deviated path merges with the best path at index k, as illustrated in FIG. 7.

In the simplest case, the remaining bits of $\hat{s}_{k-M'}$ are left unchanged. This corresponds to a single bit error in the whole error event. Of course, the number of bit errors in the error event does not necessarily indicate the likelihood of the error event, but assuming a single bit error is a good rough guess. In keeping with the DFSE idea, it may be assumed that both paths share the same decided symbols $\overline{S}_{k-M'-1}$ (those symbols from before the earliest stage of the trellis). Then the cumulative metric of the deviated path, of length M'+1, is subtracted from the corresponding cumulative metric for the best path to yield the soft value.

A more general and complex alternative is to reverse the bit of interest in $\hat{s}_{k-M'}$, and replace the rest of $\hat{s}_{k-M'}$ by all possible bit combinations. Again all of the several deviated paths thus traced will merge back with the best path at index k. Then the best cumulative metric among the deviated paths is found, and is subtracted from the best metric as before. An intermediate solution is to is to reverse the bit of interest in $\hat{s}_{k-M'}$, and replace the rest of $\hat{s}_{k-M'}$ by a few pseudo-random bit combinations.

A coarser approximation exploits the radius ρ. Referring back to FIG. 7, it may be conjectured that the reason the deviated path is missing from the SDFSE trellis is that its beginning and ending branches were pruned. In other words, their corresponding spherical branch metrics both exceeded $\rho^2$. Since it is unknown by how much the spherical branch metrics exceed the metric limit, they can be given the benefit of the doubt, and simply assigned a value $\rho^2$. In addition, it may be conjectured that the branch metrics for the best path are small, compared to $\rho^2$. Thus, the difference operation can simply be omitted. As a result, a rough but reasonable approximation to the missing soft value is $2\rho^2$. Of course, the middle branches of the deviated path are ignored in this crude approach. However, each of those middle branches may have branch metrics that are better or worse than the corresponding branch metrics of the best path. So it can be assumed that they cancel out on average in the difference operation. In a variation of this scheme, a margin Δρ may be added to ρ, to provide even more conservative soft values.

With the above variations and examples in mind, those skilled in the art will appreciate that the preceding descriptions of various embodiments of methods and apparatus for equalizing a received signal transmitted through a dispersive radio channel are given for purposes of illustration and example. As suggested above, one or more of the specific processes discussed above, including the processes illustrated in FIGS. 8 and 9 may be carried out in a wireless receiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for equalizing received signals in a communications receiver. Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a wireless receiver for equalizing a received signal transmitted through a dispersive channel, the method comprising:
    forming a trellis comprising a plurality of stages, each stage corresponding to a symbol time and comprising a plurality of nodes, each node having a node state comprising a candidate received symbol value for the node and one or more predecessor candidate received symbol values; and
    identifying a sequence of most likely symbol values corresponding to the received signal by evaluating cumulative state metrics for the nodes according to maximum-likelihood sequence estimation or decision-feedback sequence estimation criteria;
    wherein forming the trellis comprises:
        selecting, for each node of the trellis, a set of fan-out branches for the node by identifying, of all possible state transition branches from the node to successor nodes in the succeeding stage, those state transition branches that have a spherical branch metric less than a pre-determined metric limit, wherein selecting the set of fan-out branches for a given node comprises performing a tree search among candidate state transition branches based on calculating partial sums of a spherical branch metric formulation and comparing the partial sums to the pre-determined metric limit; and
        determining the cumulative state metric for the node as a function of the cumulative state metrics for predecessor nodes in the preceding stage and the spherical branch metrics for fan-out branches connecting the predecessor nodes to the node.

2. The method of claim 1, wherein selecting the set of fan-out branches for a given node comprises:
    calculating a bias parameter for the node as a function of the node state and a measured channel response;
    calculating an innovation parameter for the node by subtracting the bias parameter from a received signal value; and
    calculating a fan-out center value for the node as a function of the innovation parameter and the channel response;
    wherein the spherical branch metric for a state transition branch between the node and a given node in the succeeding stage is calculated as a function of the channel response, the fan-out center value, and a candidate symbol value corresponding to the given node in the next stage.

3. The method of claim 2, wherein the received signal comprises a multiple-input, multiple-out (MIMO) signal, and wherein the candidate received symbol values, predecessor candidate symbol values, bias parameters, innovation parameters, and fan-out center values comprise vector values.

4. The method of claim 1, further comprising determining a pre-filter response as a function of the measured channel response and filtering the received signal using the pre-filter response to obtain the received signal values used in forming the trellis.

5. The method of claim 1, further comprising generating a soft value for a bit value of an identified most likely symbol value by:
    regenerating a state transition branch corresponding to the reverse of the bit value and not previously included in the set of fan-out branches for any node in the trellis;
    calculating a regenerated spherical branch metric for the regenerated state transition branch; and
    comparing the cumulative state metric corresponding to a best path through the trellis, given the identified most likely symbol value, to an alternative cumulative state metric corresponding to an alternative path through the trellis, given the reverse of the bit value, wherein the alternative path includes the regenerated state transition branch and wherein the alternative cumulative state metric includes the regenerated spherical branch metric.

6. The method of claim 5, wherein calculating the regenerated spherical branch metric comprises computing the regenerated spherical branch metric as a function of the channel response, the fan-out center value corresponding to the source node for the regenerated state transition branch, and a candidate symbol value corresponding to the target node of the regenerated state transition branch.

7. The method of claim 1, further comprising generating a soft value for a bit value of an identified most likely symbol value by:
    identifying a best path through the trellis, given the most likely symbol value;
    determining that an alternative path through the trellis, given the reverse of the bit value, is missing at least one state transition branch; and,
    responsive to said determining, calculating the soft value as a function of the pre-determined metric limit, without calculating a spherical branch metric for the missing at least one state transition branch.

8. An equalizer circuit for equalizing a received signal transmitted through a dispersive channel, the equalizer circuit comprising one or more processing circuits configured to:
    form a trellis comprising a plurality of stages, each stage corresponding to a symbol time and comprising a plurality of nodes, each node having a node state comprising a candidate received symbol value for the node and one or more predecessor candidate received symbol values; and
    identify a sequence of most likely symbol values corresponding to the received signal by evaluating cumulative state metrics for the nodes according to maximum-likelihood sequence estimation or decision-feedback sequence estimation criteria;
    wherein the one or more processing circuits are configured to form the trellis by:
        selecting, for each node of the trellis, a set of fan-out branches for the node by identifying, of all possible state transition branches from the node to successor nodes in the succeeding stage, those state transition branches that have a spherical branch metric less than a pre-determined metric limit,
        wherein the one or more processing circuits are configured to select the set of fan-out branches for the node by performing a tree search among candidate state transition branches based on calculating partial sums of a spherical branch metric formulation and comparing the partial sums to the pre-determined metric limit; and
        determining the cumulative state metric for the node as a function of the cumulative state metrics for predecessor nodes in the preceding stage and the spherical branch metrics for fan-out branches connecting the predecessor nodes to the node.

9. The equalizer circuit of claim 8, wherein the one or more processing circuits are configured to select the set of fan-out branches for a given node by:

calculating a bias parameter for the node as a function of the node state and a measured channel response;

calculating an innovation parameter for the node by subtracting the bias parameter from a received signal value; and calculating a fan-out center value for the node as a function of the innovation parameter and the channel response;

wherein the spherical branch metric for a state transition branch between the node and a given node in the succeeding stage is calculated as a function of the channel response, the fan-out center value, and a candidate symbol value corresponding to the given node in the next stage.

10. The equalizer circuit of claim 9, wherein the received signal comprises a multiple-input, multiple-out (MIMO) signal, and wherein the candidate received symbol values, predecessor candidate symbol values, bias parameters, innovation parameters, and fan-out center values comprise vector values.

11. The equalizer circuit of claim 8, wherein the one or more processing circuits are further configured to:
determine a pre-filter response as a function of the measured channel response; and
filter the received signal using the pre-filter response to obtain the received signal values used in forming the trellis.

12. The equalizer circuit of claim 8, wherein the one or more processing circuits are further configured to generate a soft value for a bit value of an identified most likely symbol value by:
regenerating a state transition branch corresponding to the reverse of the bit value and not previously included in the set of fan-out branches for any node in the trellis;
calculating a regenerated spherical branch metric for the regenerated state transition branch; and
comparing the cumulative state metric corresponding to a best path through the trellis, given the identified most likely symbol value, to an alternative cumulative state metric corresponding to an alternative path through the trellis, given the reverse of the bit value, wherein the alternative path includes the regenerated state transition branch and wherein the alternative cumulative state metric includes the regenerated spherical branch metric.

13. The equalizer circuit of claim 12, wherein the one or more processing circuits are configured to calculate the regenerated spherical branch metric by computing the regenerated spherical branch metric as a function of the channel response, the fan-out center value corresponding to the source node for the regenerated state transition branch, and a candidate symbol value corresponding to the target node of the regenerated state transition branch.

14. The equalizer circuit of claim 8, wherein the one or more processing circuits are further configured to generate a soft value for a bit value of an identified most likely symbol value by:
identifying a best path through the trellis, given the most likely symbol value;
determining that an alternative path through the trellis, given the reverse of the bit value, is missing at least one state transition branch; and,
responsive to said determining, calculating the soft value as a function of the pre-determined metric limit, without calculating a spherical branch metric for the missing at least one state transition branch.

15. A wireless mobile terminal comprising two or more receive antennas configured to receive a multiple-input multiple-output (MIMO) signal transmitted through a dispersive channel, a receiver front-end circuit configured to amplify, downconvert, and sample the received MIMO signal, and an equalizer circuit comprising one or more processing circuits configured to:
form a trellis comprising a plurality of stages, each stage corresponding to a symbol time and comprising a plurality of nodes, each node having a node state comprising a candidate received symbol value for the node and one or more predecessor candidate received symbol values; and
identify a sequence of most likely symbol values corresponding to the received signal by evaluating cumulative state metrics for the nodes according to maximum-likelihood sequence estimation or decision-feedback sequence estimation criteria;
wherein the one or more processing circuits are configured to form the trellis by:
selecting, for each node of the trellis, a set of fan-out branches for the node by identifying, of all possible state transition branches from the node to successor nodes in the succeeding stage, those state transition branches that have a spherical branch metric less than a pre-determined metric limit; and
determining the cumulative state metric for the node as a function of the cumulative state metrics for predecessor nodes in the preceding stage and the spherical branch metrics for fan-out branches connecting the predecessor nodes to the node.

16. The wireless mobile terminal of claim 15, wherein the one or more processing circuits are configured to select the set of fan-out branches for a given node by:
calculating a bias parameter for the node as a function of the node state and a measured channel response;
calculating an innovation parameter for the node by subtracting the bias parameter from a received signal value; and
calculating a fan-out center value for the node as a function of the innovation parameter and the channel response;
wherein the spherical branch metric for a state transition branch between the node and a given node in the succeeding stage is calculated as a function of the channel response, the fan-out center value, and a candidate symbol value corresponding to the given node in the next stage.

* * * * *

UNITED STATES PATENT AND TRADEMARK OFFICE
CERTIFICATE OF CORRECTION

PATENT NO. : 8,345,784 B2
APPLICATION NO. : 12/479081
DATED : January 1, 2013
INVENTOR(S) : Khayrallah It is certified that error appears in the above-identified patent and that said Letters Patent is hereby corrected as shown below:

In the Specification

In Column 6, Line 21, delete "$A_p$," and insert -- $A_\rho$ --, therefor.

In Column 10, Line 50, in Equation (20), delete "$\int_k(j',j)$" and insert -- $f_k(j',j)$ --, therefor.

In Column 10, Line 54, in Equation (21), delete "$\int_k(j',j)$" and insert -- $f_k(j',j)$ --, therefor.

In Column 11, Lines 49-50, delete "$\int_k(j',j)$." and insert -- $f_k(j',j)$. --, therefor.

In Column 11, Line 52, delete "$\int_k(j',j)$." and insert -- $f_k(j',j)$. --, therefor.

In the Claims

In Column 18, Line 33, in Claim 15, delete "metric limit; and" and
insert -- metric limit, wherein selecting the set of fan-out branches for a given
node comprises performing a tree search among candidate state transition branches based on
calculating partial sums of a spherical branch metric formulation and comparing the partial
sums to the pre-determined metric limit; and --, therefor.

Signed and Sealed this
Fourth Day of June, 2013

Teresa Stanek Rea
*Acting Director of the United States Patent and Trademark Office*